(No Model.)
D. T. APPLEWHITE.
Vehicle Axle Box.
No. 237,718. Patented Feb. 15, 1881.
Fig. 1.
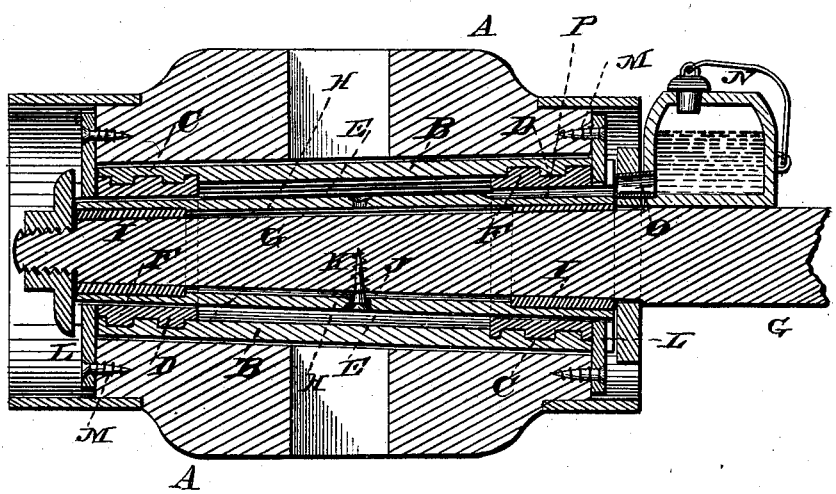
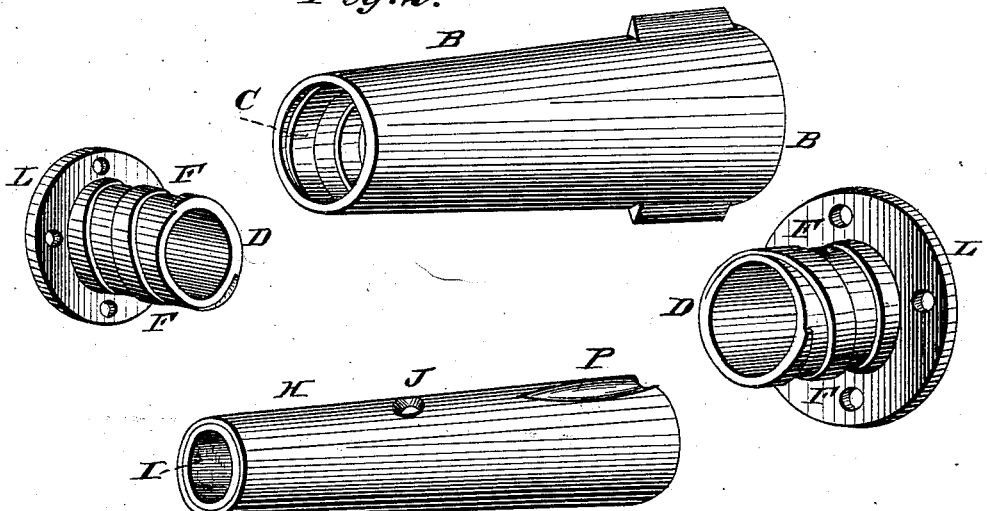
Fig. 2.
Fig. 3.
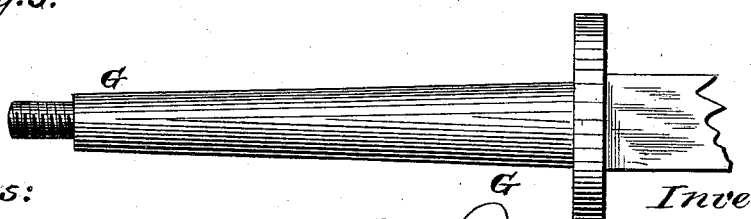
Witnesses:
Fred. G. Dieterich
P. H. Dieterich
Inventor:
D. T. Applewhite
by C. A. Snow & Co., Attys.

UNITED STATES PATENT OFFICE.

DAVID T. APPLEWHITE, OF CLAYTON, TEXAS.

VEHICLE-AXLE BOX.

SPECIFICATION forming part of Letters Patent No. 237,718, dated February 15, 1881.

Application filed November 30, 1880. (No model.)

*To all whom it may concern:*

Be it known that I, DAVID T. APPLEWHITE, of Clayton, in the county of Panola and State of Texas, have invented certain new and useful Improvements in Bearings for Vehicle-Axles; and I do hereby declare that the following is a full, clear, and exact description of the invention, which will enable others skilled in the art to which it appertains to make and use the same, reference being had to the accompanying drawings, which form a part of this specification.

Figure 1 is a longitudinal sectional view. Fig. 2 is a detail view of the axle-box and its interior bearings, and Fig. 3 is a detail view of the spindle and its exterior bearings.

Corresponding parts in the several figures are denoted by like letters of reference.

This invention relates to bearings for vehicle-axles; and it consists in certain improvements in the construction of the same, which will be hereinafter more fully described, and particularly pointed out in the claims.

In the drawings hereto annexed, A represents the hub, and B the axle-box, which is provided upon its inner side at the ends with female screw-threads C, so as to accommodate the detachable bearing-sleeves D, which are of an interior diameter somewhat less than that of the axle-box proper, in which a central annular recess, E, is thus formed. The sleeves D are, of course, provided with exterior or male screw-threads, F, enabling them to be readily adjusted in the axle-box.

G is the spindle, upon which is fitted a sleeve, H, between which and the spindle proper sleeves or cushions I, of leather, rubber, or other suitable material, are interposed. Sleeve H is provided on each side with a screw hole or opening, J, for the admission of a screw, K, fitting in a suitable opening in the upper side of the spindle, for the purpose of securing the said sleeve H in position.

The sleeves D D are secured in position and the ends of the axle-box protected from wear by flanges or washers L L, secured upon the ends of the hub by means of wood-screws M, or in any other suitable manner.

N is an oil-cup or lubricator, which is secured upon the axle by means of a clip, or in any other well-known manner. Said oil cup or reservoir is connected, by means of a tube, O, and a groove, P, cut in the sleeve H, with the central annular recess, E, in the axle-box, which is thus adapted to serve as a reservoir for lubricating material, which, by the revolution of the wheel, is conveyed or fed to the bearings.

The operation and advantages of my invention will be readily understood from the foregoing description, taken in connection with the drawings hereto annexed.

The sleeves D D and H are preferably made of brass, Babbitt metal, or other suitable anti-friction material, and they may, when worn, be easily removed and new ones substituted. The sleeve H may, in addition, be reversed, the wear being altogether upon its under side.

The provisions for lubrication are perfect, and oil need only be fed at long intervals.

Having thus described my invention, I claim and desire to secure by Letters Patent of the United States—

1. The combination of the spindle G, the detachable and reversible bearing-sleeve H, and the interposed elastic sleeves or cushions I, substantially as and for the purpose set forth.

2. The combination, with an axle-box having detachable bearing-sleeves of less interior diameter than the axle-box proper, of a spindle provided with a reversible and detachable sleeve, and interposed elastic cushions, substantially as set forth.

3. The combination of the hub, the axle-box having detachable bearing-sleeves of less interior diameter than the axle-box proper, the spindle G, having reversible and detachable sleeve H, provided with grooves P P, and the lubricator N, having tube O, substantially as and for the purpose set forth.

In testimony that I claim the foregoing as my own I have hereto affixed my signature in presence of two witnesses.

DAVID THOMAS APPLEWHITE.

Witnesses:
J. F. ADAMS,
E. J. HAYS.